(12) United States Patent
Nishiyama et al.

(10) Patent No.: US 11,453,027 B2
(45) Date of Patent: Sep. 27, 2022

(54) PREFORM COATING DEVICE

(71) Applicant: Suntory Holdings Limited, Osaka (JP)

(72) Inventors: Masanori Nishiyama, Tokyo (JP); Ichiro Tomari, Tokyo (JP); Ryo Yamane, Kanagawa (JP)

(73) Assignee: Suntory Holdings Limited, Osaka (JP)

( * ) Notice: Subject to any disclaimer, the term of this patent is extended or adjusted under 35 U.S.C. 154(b) by 240 days.

(21) Appl. No.: 16/957,194

(22) PCT Filed: Dec. 25, 2018

(86) PCT No.: PCT/JP2018/047663
§ 371 (c)(1),
(2) Date: Jun. 23, 2020

(87) PCT Pub. No.: WO2019/131678
PCT Pub. Date: Jul. 4, 2019

(65) Prior Publication Data
US 2020/0331022 A1    Oct. 22, 2020

(30) Foreign Application Priority Data

Dec. 25, 2017 (JP) .............................. JP2017-248463

(51) Int. Cl.
| | |
|---|---|
| *B05C 13/02* | (2006.01) |
| *B05C 5/00* | (2006.01) |
| *B05C 9/14* | (2006.01) |
| *B29C 49/22* | (2006.01) |

(52) U.S. Cl.
CPC .............. *B05C 13/02* (2013.01); *B05C 5/001* (2013.01); *B05C 9/14* (2013.01); *B29C 49/22* (2013.01)

(58) Field of Classification Search
None
See application file for complete search history.

(56) References Cited

U.S. PATENT DOCUMENTS

| | | |
|---|---|---|
| 4,054,630 A | 10/1977 | Wang |
| 4,192,843 A | 3/1980 | Trieschock et al. |
| 4,267,143 A | 5/1981 | Roullet |
| | (Continued) | |

FOREIGN PATENT DOCUMENTS

| | | |
|---|---|---|
| CA | 2573140 A1 | 1/2006 |
| CN | 101622119 A | 1/2010 |
| | (Continued) | |

OTHER PUBLICATIONS

International Search Report dated Mar. 12, 2019 for PCT/JP2018/047663.

*Primary Examiner* — Jethro M. Pence
(74) *Attorney, Agent, or Firm* — Faegre Drinker Biddle & Reath LLP

(57) ABSTRACT

A preform coating device is provided with: a conveyance part that conveys a preform; a dispenser that discharges a coating liquid toward the preform; a drier that is disposed along the conveyance route of the conveyance part so as to be separated from the dispenser, and that dries the coating liquid applied to the preform by irradiating, with infrared rays, the coating liquid applied to the preform; and a first air sending mechanism that sends air, toward the preform, for inhibiting the temperature of the preform from rising at the position where the preform is irradiated with infrared rays by the drier.

6 Claims, 6 Drawing Sheets

(56) References Cited

U.S. PATENT DOCUMENTS

| | | | |
|---|---|---|---|
| 2005/0033562 A1* | 2/2005 | Narushima | B29C 49/00 |
| | | | 703/2 |
| 2010/0015269 A1 | 1/2010 | Matsushita et al. | |
| 2011/0034992 A1* | 2/2011 | Papp | B05D 1/002 |
| | | | 427/2.25 |
| 2012/0306126 A1 | 12/2012 | Fuss et al. | |
| 2013/0260046 A1 | 10/2013 | Komatsubara et al. | |
| 2017/0043521 A1 | 2/2017 | Ulutürk et al. | |
| 2017/0136677 A1 | 5/2017 | Sugimori et al. | |
| 2018/0264517 A1 | 9/2018 | Tomari et al. | |

FOREIGN PATENT DOCUMENTS

| | | |
|---|---|---|
| CN | 103331904 A | 10/2013 |
| CN | 103357542 A | 10/2013 |
| CN | 104149322 A | 11/2014 |
| CN | 106163763 A | 11/2016 |
| CN | 206626912 U | 11/2017 |
| JP | S5292275 A | 8/1977 |
| JP | S54-12175 A | 1/1979 |
| JP | S59-216654 A | 12/1984 |
| JP | H03-98975 U | 10/1991 |
| JP | H05-34068 A | 2/1993 |
| JP | 2012-250771 A | 12/2012 |
| JP | 2014-151632 A | 8/2014 |
| JP | 2015-199012 A | 11/2015 |
| JP | 2017-64640 A | 4/2017 |
| JP | 2017-65149 A | 4/2017 |

* cited by examiner (a)

(b)

(c)

(d)

PREFORM COATING DEVICE

CROSS REFERENCES TO RELATED APPLICATIONS

This application is the National Stage of International Application No. PCT/JP2018/047663 filed Dec. 25, 2018, and claims benefit of Japanese Application No. 2017-248463 filed on Dec. 25, 2017.

FIELD

The present invention relates to a preform coating device for coating plastic bottle preforms with a coating solution.

BACKGROUND

Today, plastic bottles such as polyethylene terephthalate (PET) plastic containers (PET bottles) are widely used for storing beverages or food. Plastic bottles are molded by inflating a test tube-like preform by stretch blow molding.

As disclosed in Patent Literature 1, forming a barrier coating on the outer peripheral surface of the preform to reduce the penetration of gases such as oxygen and carbon dioxide into and out of the plastic bottle is known. The barrier coating is formed by applying a coating solution to the outer peripheral surface of the preform and drying the applied coating solution.

The preform coating devices described in, for example, Patent Literature 2 and 3 are known as devices for forming a coating. In these devices, one or a plurality of preforms are conveyed by a conveyance part such as a belt conveyor or a chain conveyor, and a coating solution is discharged toward the retained preform from a dispenser. The applied coating solution is dried by a dryer.

CITATION LIST

Patent Literature

[PTL 1] Japanese Unexamined Patent Publication (Kokai) No. 2012-250771
[PTL 2] Japanese Unexamined Patent Publication (Kokai) No. 2017-64640
[PTL 3] Japanese Unexamined Patent Publication (Kokai) No. 2017-65149

SUMMARY

Technical Problem

In the relevant technical field, development of a device with which preform quality can be increased is desired.

Solution to Problem

An aspect of the present disclosure provides a preform coating device comprising a conveyance part for conveying a preform, a dispenser for discharging a coating solution toward the preform, a dryer that is arranged spaced apart from the dispenser along a conveyance path of the conveyance part and that dries the coating solution applied to the preform by irradiating the coating solution applied to the preform with infrared light, and a first blower mechanism that blows gas on the preform for reducing the temperature of the preform, at a position in which the preform is irradiated with the infrared light by the dryer.

In the preform coating device according to this aspect of the present disclosure, the coating solution applied to the preform is dried by molecular vibration caused by the irradiation of infrared light. The temperature of the preform is raised by the irradiation of infrared light. When the temperature of the preform increases excessively, softening and/or whitening of the preform may occur. In the preform coating device according to the aspect of the present disclosure, gas for reducing the temperature of the preform is blown toward the preform at the position at which the preform is irradiated with infrared light by the dryer. Thus, excessive increases of the temperature of the preform can be prevented. Furthermore, whitening and shrinkage of the preform can be prevented. Therefore, the quality of the preform can be improved.

The preform coating device may further comprise a flow rate adjustment mechanism for adjusting the flow rate of the first blower mechanism. In this case, the flow rate for reducing the temperature of the preform can be optimized.

The preform coating device may further comprise a reflector arranged at a position facing the dryer across the preform. In this case, the infrared light emitted from the dryer can be redirected toward the preform. Therefore, the coating solution can be efficiently dried.

The first blower mechanism may blow room temperature gas. In this case, a simple blower mechanism can be adopted. Thus, increases in the cost of the device can be avoided.

The preform coating device may further comprise a second blower mechanism that blows gas on a surface of the dryer for reducing the temperature of the surface of the dryer. In this case, the transmission of excess heat from the surface of the dryer to the preform can be prevented.

The preform coating device may further comprise a flow rate adjustment mechanism for adjusting a flow rate of the second blower mechanism. In this case, the flow rate for reducing the temperature of the surface of the dryer can be optimized.

The second blower mechanism may blow room temperature gas. In this case, a simple blower mechanism can be adopted. Thus, increases in the cost of the device can be avoided.

Advantageous Effects of Invention

According to the present invention, a device with which preform quality can be increased can be provided.

The embodiments of the present invention will be described in detail below with reference to the drawings. Note that in the description below, identical components are assigned the same reference signs.

<Plastic Bottle Molding Method>

Figure 2:
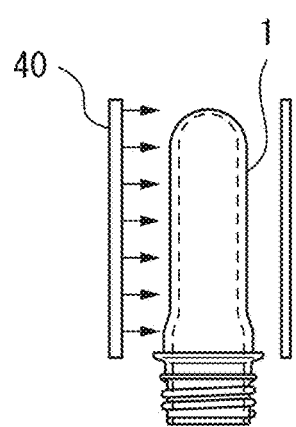
FIGS. 2(*a*) to (*d*) show a stretch blow molding method for molding a plastic bottle from a preform.
Figure 2:
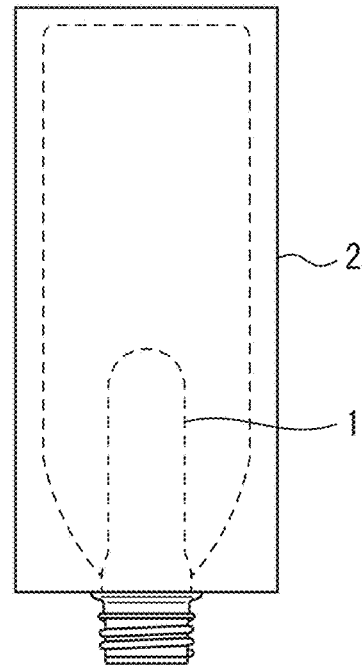
Figure 2:
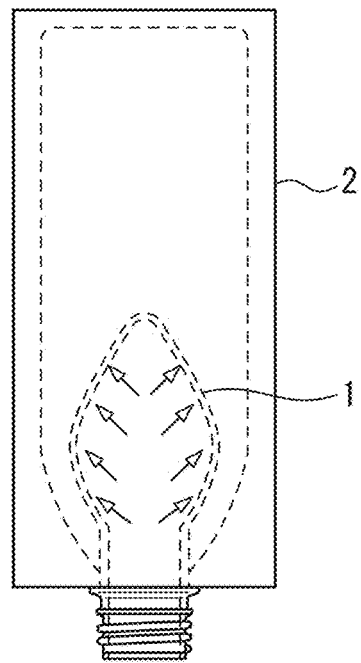
Figure 2:
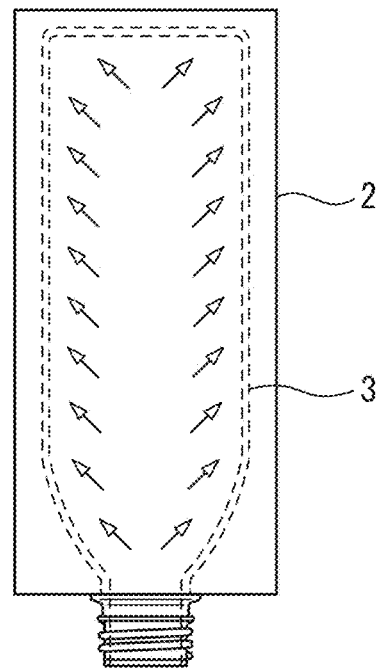
Figure 3:
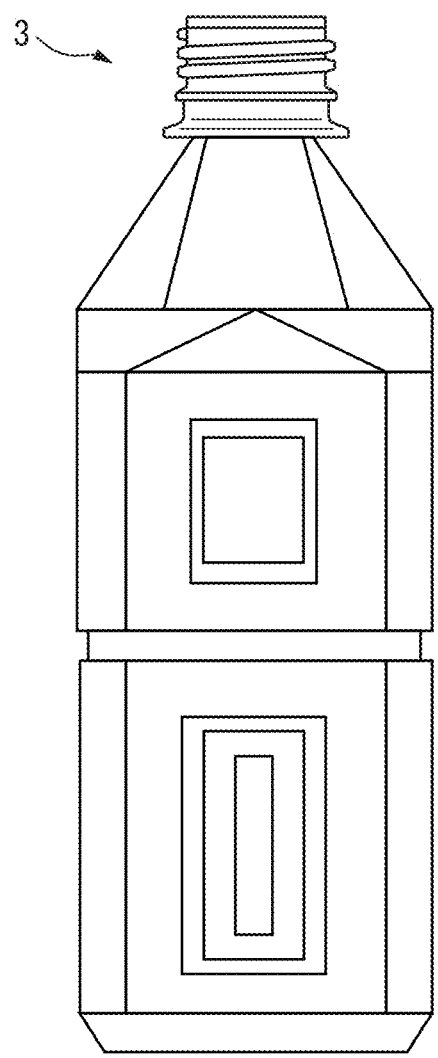
FIG. 3 shows a plastic bottle molded from a preform.

A method for molding a plastic bottle from a preform will be briefly described with reference to FIGS. 1 to 3. Note that as used herein, "plastic bottle" means a bottle composed of a plastic such as polyethylene terephthalate (PET), polypropylene (PP), or polyethylene (PE), and is not limited to PET bottles.

Figure 1:
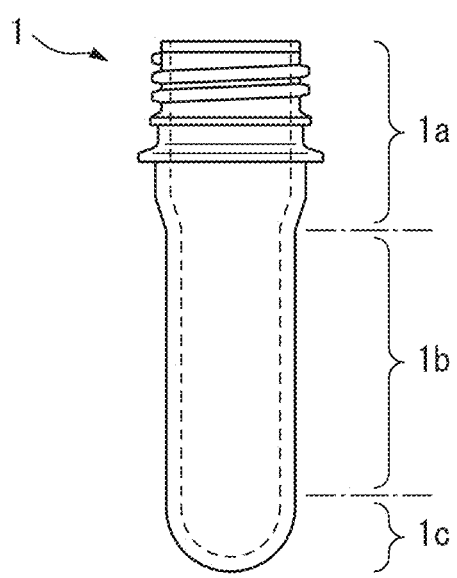
FIG. 1 shows a plastic bottle preform.

FIG. 1 shows a plastic bottle preform 1. The preform 1 is molded from a resin by injection molding or PCM (preform compression molding). The preform 1 comprises an opening 1a fitting with a plastic bottle cap, a cylindrical body 1b adjacent the opening 1a, and a bottom 1c for closing one end of the cylindrical body 1b, and has a test tube-like shape. Male threading which engages with female threading of the plastic bottle cap is formed on the outer peripheral surface of the opening 1a. The end of the preform 1 on the opening 1a side is open.

After molding of the preform 1, a barrier coating is formed on the outer peripheral surface of the preform 1. The barrier coating is formed by applying a coating solution to the outer peripheral surface of the preform 1, and drying the applied coating solution. The barrier coating can reduce the transmission of gases such as oxygen and carbon dioxide into and out of the plastic bottle molded from the preform 1, and extend the shelf life of beverages and the like contained in the plastic bottle. The barrier coating can also improve the scratch resistance and moisture resistance of the plastic bottle.

Plastic bottles are molded from a preform by stretch blow molding. FIGS. 2(a) to (d) shows the stretch blow molding method for molding a plastic bottle 3 from a preform 1. First, as shown in FIG. 2(a), the preform 1 is heated by a preform heating device 40. Next, as shown in FIG. 2(b), the preform 1 is inserted into a mold 2, and the mold 2 is closed. Next, as shown in FIG. 2(c), the preform 1 is stretched longitudinally with a stretching rod (not shown) and transversely with pressurized air. Next, as shown in FIG. 2(d), once the preform 1 has expanded to a desired shape, the inner surface of the plastic bottle 3 is cooled by cooling air, and the plastic bottle 3 is ultimately removed from the mold 2. FIG. 3 shows the plastic bottle 3 molded from the preform 1.

<Preform Coating Device>

Figure 4:
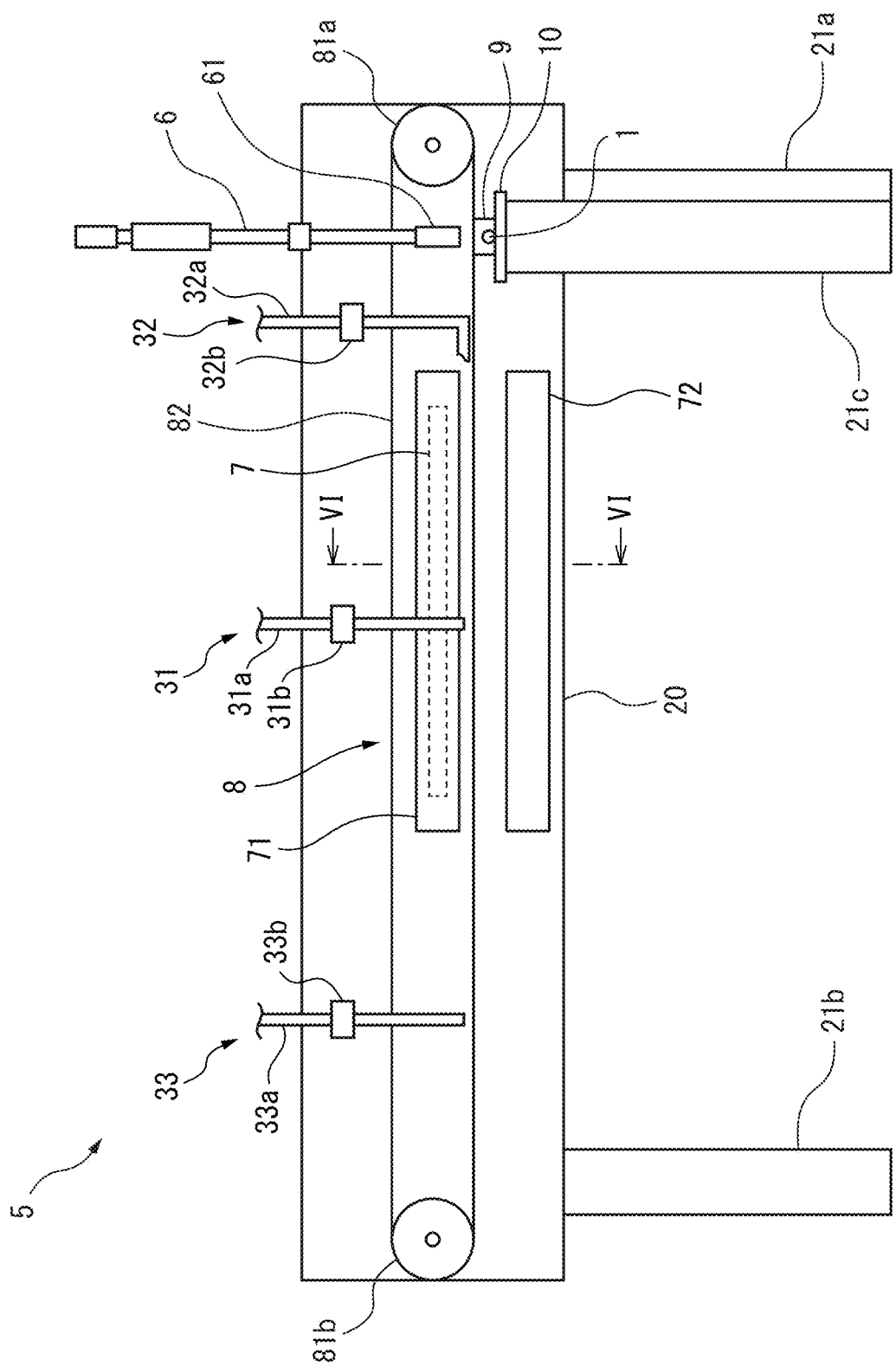
FIG. 4 is a schematic front view of the main portions of a preform coating device according to an embodiment of the present invention.

The preform coating device according to an embodiment of the present invention will be described in detail below with reference to FIGS. 4 to 6. FIG. 4 is a schematic front view of the main portions of a preform coating device 5 according to an embodiment of the present invention.

The preform coating device 5 is configured so as to form a barrier coating on the outer peripheral surface of the preform 1 by applying a coating solution to the preform 1 and drying the applied coating solution. To this end, the preform coating device 5 comprises a dispenser 6 for applying a coating solution to the preform 1, and a dryer 7 for drying the applied coating solution. The dryer 7 is arranged spaced apart from the dispenser 6. In the present embodiment, the dryer 7 is arranged horizontally spaced apart from the dispenser 6.

The preform coating device 5 further comprises a conveyance part 8 for conveying the preform 1. The conveyance part 8 moves the preform 1 from the location of the dispenser 6 toward the location of the dryer 7. In the present embodiment, the conveyance part 8 is a belt conveyor. The conveyance part 8 includes two pulleys 81a, 81b, and a belt 82 hung on the pulleys 81a, 81b. The pulleys 81a, 81b are rotatably secured to a pulley support plate 20 which extends in the horizontal direction. The pully support plate 20 is supported by two supporting columns 21a, 21b which extend in the vertical direction. One of the pulleys 81a, 81b is driven by a motor (not illustrated). By driving one of the pullies 81a, 81b clockwise in FIG. 4, the belt 82 moves clockwise in FIG. 4. As a result, the conveyance part 8 can convey a preform 1. Note that the number of pullies may be three or more. The conveyance part 8 may be another mechanism such as a chain conveyor as long as it can convey the preform 1.

Figure 5:
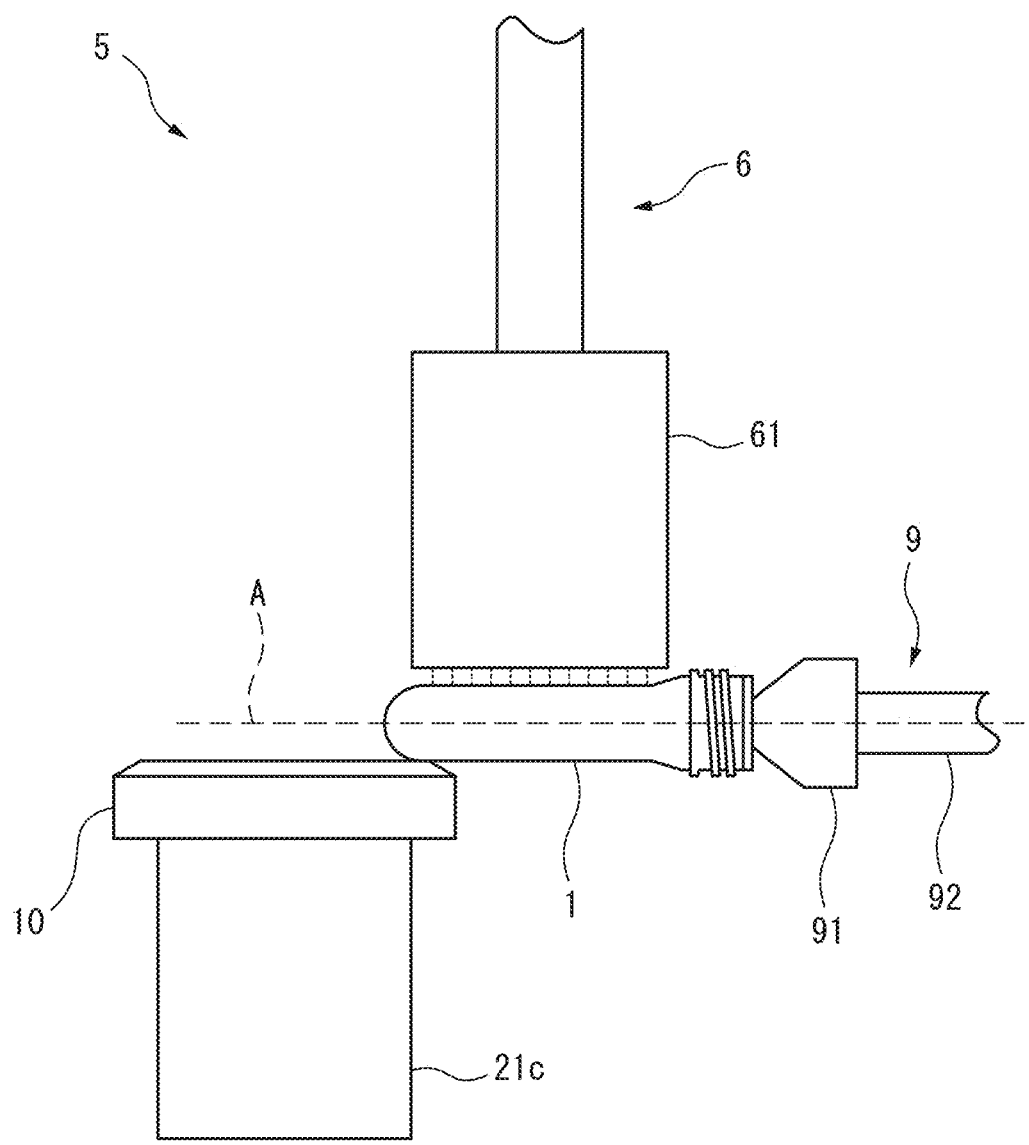
FIG. 5 is a schematic partial side view of the preform coating device at the time of application of a coating solution.

FIG. 5 is a schematic partial side view of the preform coating device 5 at the time of application of the coating solution. The preform coating device 5 further comprises a rotary retention part 9 which retains the preform 1 in the horizontal direction and which rotates the preform 1 about the axis A of the preform 1. The rotary retention part 9 includes a chuck 91 for retaining the opening 1a of the preform 1, and a rotary shaft 92 connected to the chuck 91.

The rotary retention part 9 retains the preform 1 in the horizontal direction by retaining the opening 1a of the preform 1 with the chuck 91. Thus, the preform 1 is cantilevered by the rotary retention part 9. The chuck 91 is, for example, a vacuum chuck that suctions the preform 1 with air, or a mechanical chuck that mechanically retains the preform 1. Note that though the chuck 91 in the present embodiment retains the interior of the opening 1a of the preform 1, the chuck 91 may retain the exterior of the opening 1a of the preform 1.

The rotary shaft 92 is driven by a motor (not illustrated), and rotates together with the chuck 91. The axis of the rotary shaft 92 is co-axial with the axis A of the preform 1. Thus, by rotating the rotary retention part 9, the preform 1 can be rotated about the axis A. As shown in FIG. 4, the rotary retention part 9 is connected to the belt 82. Thus, the conveyance part 8 can convey the preform 1 by moving the rotary retention part 9.

The dispenser 6 is arranged above the cylindrical body 1b. The dispenser 6 houses the coating solution, and discharges the coating solution toward the preform 1. The coating solution is supplied to the dispenser 6 by a pump or the like.

The dispenser 6 has a nozzle 61 for discharging the coating solution toward the cylindrical body 1b of the preform 1. A slot is formed in the tip of the nozzle 61. The dispenser 6 discharges the coating solution in a planar-like shape from the slot toward the preform 1. The width of the slot (the length in the axial direction of the preform 1) can be adjusted, and is, for example, 15 mm to 40 mm. The vertical width of the slot (the length in the direction orthogonal to the axial direction of the preform 1) can be adjusted, and is, for example, 0.1 mm to 1.0 mm. The dispenser 6 can move in the vertical direction. Thus, the distance between the slot of the nozzle 61 and the cylindrical body 1b of the preform 1 can be adjusted. Note that though the coating solution is discharged from above the preform 1 in the present embodiment, the coating solution may be discharged in other directions, for example, from below the preform 1. Also in this case, the dispenser 6 is configured so that the distance between the slot of the nozzle 61 and the cylindrical body 1b of the preform 1 can be adjusted.

The conveyance part 8 does not move the rotary retention part 9 while the dispenser 6 discharges coating solution. In contrast, the rotary retention part 9 rotates the preform 1 while the dispenser 6 discharges coating solution. The dispenser 6 continues to discharge coating solution while the preform 1 makes substantially one rotation. The discharged coating solution is wound up by the outer peripheral surface of the cylindrical body 1b of the preform 1. As a result, coating solution is applied to the entirety of the outer peripheral surface of the cylindrical body 1b of the preform 1. At this time, since the preform 1 is retained in the horizontal direction, the thickness of the coating solution is prevented from gradually increasing toward the bottom 1c of the preform 1 due to gravity.

However, in the present embodiment, since the preform 1 is cantilevered by the rotary retention part 9, the outer peripheral surface of the preform 1 on the bottom 1c side tends to move away from the axis A of the preform 1 by the rotation of the preform 1. In other words, the rotation of the preform 1 causes eccentricity of the preform 1. As a result, the thickness of the coating solution applied to the preform 1 may not be uniform.

In the present embodiment, in order to suppress eccentricity of the preform 1, the preform coating device 5 further comprises a preform support part 10. The preform support part 10 is supported by a supporting column 21c. The preform support part 10 rotatably supports the preform 1 at least while the dispenser 6 discharges the coating solution. The preform support part 10 supports the end of the cylindrical body 1b of the preform 1 on the bottom 1c side so as not to contact the applied coating solution. At least a portion of the preform support part 10 which contacts the preform 1 is made of a resin, and is preferably made of polyoxymethylene (POM). Thus, it is possible to effectively prevent eccentricity of the preform 1 and to prevent the preform 1 from being damaged by the contact between the preform support part 10 and the preform 1.

After the coating solution has been applied, the preform 1 is conveyed to the location of the dryer 7 by the conveyance part 8. The conveyance part 8 conveys the preform 1 in a horizontally retained state. As a result, movement of the coating solution toward the bottom 1c of the preform 1 due to gravity during conveyance of the preform 1 is prevented. Thus, according to the present embodiment, variations in the thickness of the coating layer on the outer peripheral surface of the preform 1 can be reduced.

The dryer 7 is arranged spaced apart from the dispenser 6 along the conveyance path of the conveyance part 8, on the downstream side of the dispenser 6. The dryer 7 emits infrared light toward the coating solution applied to the preform 1. The coating solution applied to the preform 1 is dried by molecular vibration caused by irradiation with the infrared light. The dryer 7 is, for example, a carbon heater or a far-infrared light heater. The dryer 7 can extend, for example, along the conveyance path of the conveyance part 8. The preform coating device 5 can include a fixture 71 for securing the dryer 7. The rotary retention part 9 rotates the preform 1 while the dryer 7 dries the coating solution. As a result, the coating solution applied to the preform 1 can be uniformly dried.

Figure 6:
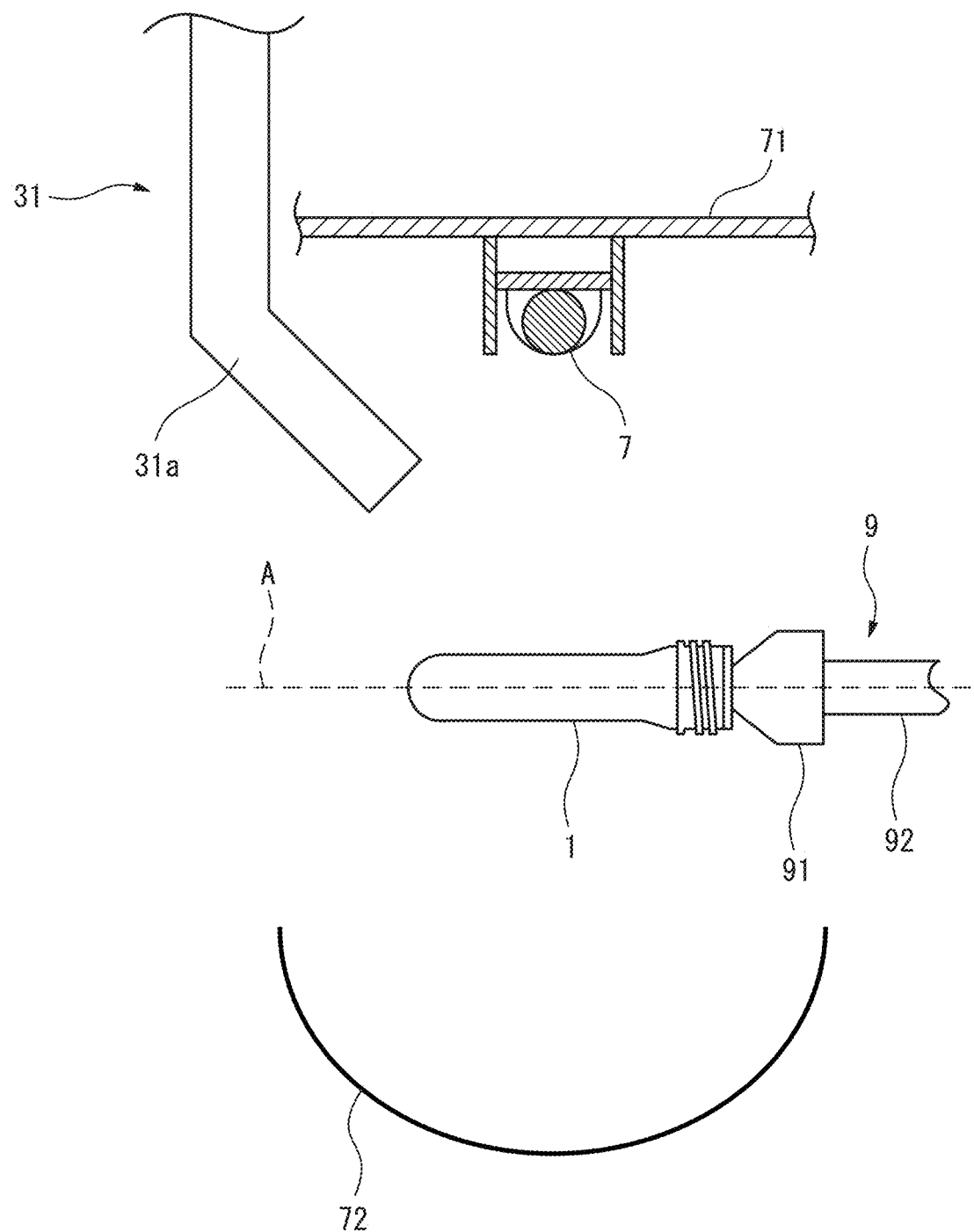
FIG. 6 is a cross-sectional view as viewed schematically along line VI-VI of FIG. 4.

FIG. 6 is a schematic cross-sectional view taken along line VI-VI of FIG. 4. Referring to FIG. 6, in the present embodiment, the preform coating device 5 further comprises a reflector 72. The reflector 72 is arranged in a position facing the dyer 7 across the preform 1. The reflector 72 can, for example, extend along the conveyance path of the conveyance part 8. The reflector 72 is configured so as to redirect the infrared light emitted from the dryer 7 toward the preform 1. The surface of the reflector 72 facing the dryer 7 can have, for example, a substantially arc-shaped or substantially U-shaped cross-section. The reflector 72 may be, for example, a metal member (for example, a stainless steel or other metal plate) having a mirror-finished surface facing the dryer 7.

Referring to FIG. 4, the preform coating device 5 further comprises a first blower mechanism 31 for blowing gas on the preform 1 during drying by the dryer 7, a second blower mechanism 32 for blowing gas onto the surface of the dryer 7, and a third blower mechanism 33 for blowing gas on the preform 1 downstream from the dryer 7.

Referring to FIG. 6, the first blower mechanism 31 blows gas on the preform 1 for reducing temperature increases of the preform 1, in a position in which the preform 1 is irradiated with infrared light by the dryer 7. In the present embodiment, the first blower mechanism 31 is configured so as to blow gas from an obliquely upward direction, at substantially the center of the dryer 7 on the conveyance path of the conveyance part 8. The first blower mechanism 31 may be configured so as to blow gas from another direction, at another location. The first blower mechanism 31 has a pipe 31a for blowing gas. The pipe 31a can be connected to, for example, an unillustrated blower or compressor.

When the preform 1 is irradiated with the infrared light, the temperature of the preform 1 increases. In order to prevent softening and whitening of the preform 1, the first blower mechanism 31 blows gas on the preform 1 so as to maintain the temperature of the preform 1 at or below a predetermined temperature. The first blower mechanism 31 may blow, for example, room temperature gas (e.g., air or another gas) toward the preform 1. The room temperature air can be air which has not been intentionally heated or cooled by supplement equipment (e.g., air around a blower or compressor). The first blower mechanism 31 may, for example, blow gas which has been heated within a range where temperature increases of the preform 1 can be reduced, or can blow cooled gas, if necessary. The preform coating device 5 may include a thermometer (not illustrated) capable of measuring the temperature of at least one of the surface of the preform 1, the surface of the dryer 7, or periphery of the preform 1 and the dryer 7.

Referring to FIG. 4, the first blower mechanism 31 has a flow rate adjustment mechanism 31b for adjusting the flow rate. The flow rate adjustment mechanism 31b can have, for example, a flow rate meter and/or a valve. When, for example, the flow rate is excessively low, there is a risk that temperature increases of the preform 1 cannot be sufficiently reduced. When, for example, the flow rate is excessively high, there is a risk of rippling of the coating solution applied to the preform 1, whereby there is a risk that the thickness of the coating solution may vary. In this case, there is a risk that the coating solution in portions where the thickness is large may not sufficiently dry. The flow rate of the first blower mechanism 31 can be, for example, 100 km$^3$/min. It should be noted that this value is merely exemplary.

The second blower mechanism 32 blows gas on the surface of the dryer 7 for reducing temperature increases of the surface of the dryer 7. In the present embodiment, the second blower mechanism 32 is configured so as to blow gas on the surface of the dryer 7 from the upstream side of the conveyance path of the conveyance part 8. The second blower mechanism 32 may be configured to as to blow gas onto the surface of the dryer 7 from the downstream side or from another location. The second blower mechanism 32 has a pipe 32a for blowing gas. The pipe 32a can be connected to, for example, an unillustrated blower or compressor.

When the preform 1 is irradiated with the infrared light, the temperature of the surface of the dryer 7 increases. When the temperature of the surface of the dryer 7 increases excessively, there is a risk that excess heat will be imparted to the preform 1. The present inventors have discovered that since the dryer 7 dries the coating solution by the vibration of molecules caused by the irradiation of the infrared light, even if the temperature of the surface of the dryer 7 is lowered, the time for drying the coating solution does not change or does not substantially change. The second blower mechanism 32 can prevent the transmission of excess heat to the preform 1 by reducing temperature increases of the surface of the dryer 7. The second blower mechanism 32 may, for example, blow room temperature gas toward the surface of the dryer 7. The second blower mechanism 32 may, for example, blow gas which has been heated within a range where temperature increases of the surface of the dryer 7 can be reduced, or can blow cooled gas, if necessary.

The second blower mechanism 32 has a flow rate adjustment mechanism 32b for adjusting the flow rate. The flow rate adjustment mechanism 32b can have, for example, a flow rate meter and/or a valve. The flow rate of the second blower mechanism 32 may be, for example, greater than the flow rate of the first blower mechanism 31, and can be, for example, 500 km$^3$/min. It should be noted that this value is merely exemplary.

The third blower mechanism 33 is arranged spaced apart from the dryer 7 along the conveyance path of the conveyance part 8, on the downstream side of the dryer 7. The third blower mechanism 33 blows gas toward the preform 1 irradiated with the infrared light. The third blower mechanism 33 has a pipe 33a for blowing gas. The pipe 33a can be connected to, for example, an unillustrated blower or compressor.

The temperature of the preform 1 irradiated with the infrared light does not drop to room temperature for some time. Thus, even if the preform 1 with undried coating solution is conveyed downstream from the dryer 7, the coating solution can be dried by the remaining heat. By fanning the preform 1 in this state, drying of the coating solution can be promoted. Thus, the third blower mechanism 33 may reduce the time for irradiation of the preform 1 with the infrared light by the dryer 7. The third blower mechanism 33 may blow, for example, room temperature gas toward the preform 1. The third blower mechanism 33 may, for example, blow heated gas or may blow cooled gas, if necessary.

The third blower mechanism 33 has a flow rate adjustment mechanism 33b for adjusting the flow rate. The flow rate adjustment mechanism 33b can have, for example, a flow rate meter and/or a valve. When, for example, the flow rate is excessively low, there is a risk that several minutes will be necessary for the coating solution applied to the preform 1 to dry. When, for example, the flow rate is excessively high, there is a risk of rippling of the coating solution applied to the preform 1, whereby there is a risk that the thickness of the coating solution may vary. In this case, there is a risk that the coating solution in portions where the thickness is large may not sufficiently dry. The flow rate of the third blower mechanism 33 can be, for example, 100 km$^3$/min. It should be noted that this value is merely exemplary.

After the coating solution has dried, the conveyance part 8 conveys the preform 1 to the downstream of the third blower mechanism 33. Thereafter, the rotary retention part 9 releases the preform 1, and the preform 1 is removed from the preform coating device 5. Thus, according to the preform coating device 5, formation of a barrier coating on the outer peripheral surface of the preform 1 can be automated.

The coating solution used in the present embodiment is, for example, a barrier coating solution having a gas barrier function such as a polyvinyl alcohol (PVA) solution. Note that the coating solution may be a solution of a barrier resin such as a water-soluble polyamide, water-soluble polyester, polyvinylidene chloride (PVDC), polyacrylonitrile, ethylene-vinyl alcohol copolymer resin (EVOH), or polyglycolic acid. The coating solution may be obtained by adding an inorganic material to any of the solutions described above. The viscosity of the barrier coating solution is, for example, 25 mPa·s or more and 10000 mPa·s or less.

Note that after the barrier coating solution applied to the preform 1 has dried, a protective coating solution for protecting the barrier coating solution may be further applied on the barrier coating solution. The protective coating solution is, for example, a water-insoluble coating agent such as a polyolefin dispersion solution, various modified polyolefin dispersion solutions, or polyvinyl butyral (PVB). The viscosity of the protective coating solution may be, for example, 0.5 mPa·s or more and 100 mPa·s or less. Like the barrier coating solution, the protective coating solution can be applied to the preform 1 using the preform coating device 5.

In the preform coating device 5 according to the present embodiment described above, the coating solution applied to the preform 1 is dried by molecular vibration caused by the irradiation of infrared light. The temperature of the preform 1 is increased due to the irradiation of infrared light. When the temperature of the preform 1 increases excessively, softening and/or whitening of the preform 1 may occur. In the preform coating device 5, gas for reducing temperature increases of the preform 1 is blown toward the preform 1 by the first blower mechanism 31 in the position in which the preform 1 is irradiated with the infrared light by the dryer 7. Thus, excessive temperature increases of the preform 1 can be prevented. Therefore, the quality of the preform 1 can be increased.

The preform coating device 5 further comprises a flow rate adjustment mechanism 31b for adjusting the flow rate of the first blower mechanism 31. Thus, the flow rate can be optimized in order to reduce temperature increases of the preform 1.

The preform coating device 5 further comprises a reflector 72 arranged in a position opposite the dryer 7 across the preform 1. Thus, infrared light emitted from the dryer 7 can be redirected toward the preform 1. Thus, the coating solution can be efficiently dried.

The first blower mechanism 31 blows room temperature gas. Thus, a simple blower mechanism can be adopted, whereby increases in the cost of the device can be avoided.

The preform coating device 5 further comprises a second blower mechanism 32 for blowing gas on the surface of the dryer 7 for reducing temperature increases of the surface of the dryer 7. Thus, the transmission of excess heat from the surface of the dryer 7 to the preform 1 can be prevented.

The preform coating device 5 further comprises a flow rate adjustment mechanism 32b for adjusting the flow rate of the second blower mechanism 32. Thus, the flow rate can be optimized in order to reduce temperature increases of the surface of the dryer 7.

The second blower mechanism 32 blows room temperature gas. Thus, a simple blower mechanism can be adopted, whereby increases in the cost of the device can be avoided.

In the preform coating device 5, the third blower mechanism 33 for blowing gas toward the preform 1 is provided on the downstream of the dryer 7. Thus, in addition to drying by the dryer 7, the coating solution can be dried by blowing at the downstream of the dryer 7. Thus, the time for drying the coating solution by the dryer 7 can be reduced, i.e., the time for irradiating the preform 1 with infrared light by the dryer 7 can be reduced, whereby excessive temperature increases of the preform 1 can be prevented. Therefore, the quality of the preform 1 can be improved.

The preform coating device 5 may further comprise a flow rate adjustment mechanism 33b for adjusting the flow rate of the third blower mechanism 33. Thus, the flow rate can be optimized in order to dry the coating solution.

The third blower mechanism 33 blows room temperature gas. Thus, a simple blower mechanism can be adopted, whereby increases in the cost of the device can be avoided.

Though the preferred embodiments according to the present invention have been described above, the present invention is not limited to these embodiments and various modification and changes can be made within the scope described in the claims. For example, the preform coating device 5 may comprise a plurality of rotary retention parts 9. In this case, the plurality of rotary retention parts 9 are arranged along the belt 82 of the conveyance part 8 spaced apart at predetermined intervals, and the conveyance part 8 can continuously convey a plurality of preforms 1. Due to this configuration, a plurality of preforms 1 can be continuously coated, whereby preform 1 productivity can be improved.

For example, the preform coating device 5 may comprise a plurality of dispensers 6. Furthermore, for example, the dispenser 6 may have a plurality of nozzles 61.

For example, the preform coating device 5 need not comprise a reflector 72. In this case, in addition to the dryer 7 arranged above the preform 1, as shown in FIG. 6, the preform coating device 5 may comprise another dryer arranged in a position facing the dryer 7 (arranged below the preform 1). In this case, the additional dryer may be provided with a second blower mechanism.

For example, the rotary retention part 9 may retain the preform 1 in a direction other than the horizontal direction.

EXAMPLES

In order to investigate the effects of the first blower mechanism and the third blower mechanism, coating solutions applied to preforms were dried under the following conditions.

Coating Solution: PVA solution
Amount of applied Coating Solution: 230 mg
Dryer: Heaters arranged above and below the preform
Flow Rate of First Blower Mechanism: 100 km³/min (note that when the flow rates of the first blower mechanism and the third blower mechanism were 160 km³/min or more, rippling of the coating solution occurred, causing drying defects.)
Flow Rate of Third Blower Mechanism: 100 km³/min The results are shown in Table 1. The drying times in table 1 represent the time necessary for the coating solution to dry. In Examples 2 to 5, in which a third blower mechanism was used, the drying time by the third blower mechanism (lower value) is also shown as the drying time, in addition to the drying time by the heater and/or the first blower mechanism (upper value).

TABLE 1

| | Heater Temp (° C.) | Drying Process | Drying Time (s) | Preform Softening (shrinkage) |
|---|---|---|---|---|
| Comp Ex | 550 | heater | 25 | maximum (w/whitening) |
| Ex 1 | 550 | heater<br>first blower mechanism | 20 | significant |
| Ex 2 | 550 | heater<br>first blower mechanism<br>third blower mechanism | 15<br><br>5 | moderate |

TABLE 1-continued

| | Heater Temp (° C.) | Drying Process | Drying Time (s) | Preform Softening (shrinkage) |
|---|---|---|---|---|
| Ex 3 | 300 | heater<br>first blower mechanism<br>third blower mechanism | 30<br><br>5 | slight |
| Ex 4 | 100 | heater<br>first blower mechanism<br>third blower mechanism | 60<br><br>5 | N/A |
| Ex 5 | 100 | heater<br>third blower mechanism | 120<br>5 | N/A |

In the Comparative Example, the coating solution was dried by only the heater. The heater temperature was 550° C. This preform had the greatest softening. Whitening occurred in this preform.

In Example 1, the coating solution was dried by the heater and the first blower mechanism. The heater temperature was 550° C. Though this preform had significant softening, whitening did not occur. By comparing the Comparative Example and Example 1, it can be understood use of the first blower mechanism resulted in an increase in the quality of the preform.

In Example 2, the coating solution was dried by the heater, the first blower mechanism, and the third blower mechanism. The heater temperature was 550° C. A moderate degree of softening occurred in the preform. By comparing Example 1 and Example 2, it can be understood that use of the third blower mechanism resulted in a further increase in the quality of the preform.

In Example 3, the coating solution was dried by the heater, the first blower mechanism, and the third blower mechanism. The heater temperature was 300° C. A slight amount of softening occurred in the preform.

In Example 4, the coating solution was dried by the heater, the first blower mechanism, and the third blower mechanism. The heater temperature was 100° C. No softening occurred in the preform.

In Example 5, the coating solution was dried by the heater and the third blower mechanism. The heater temperature was 100° C. No softening occurred in the preform.

In order to investigate the effects of the reflector, coating solutions applied to preforms were dried under the following conditions.

Coating Solution: PVA solution
Amount of applied Coating Solution: 230 mg
Dryer: Heaters arranged above and below the preform
Dryer Temperature: 300° C.
Reflector: Mirror-finished stainless steel plate The results are shown in Table 2. Drying time in Table 2 represents the time necessary for drying the coating solution.

TABLE 2

| | Upper Heater | Lower Heater | Reflector | Drying Time (s) |
|---|---|---|---|---|
| Example 6 | Present | Present | Absent | 90 |
| Example 7 | Present | Absent | Absent | 150 |
| Example 8 | Present | Absent | Present | 120 |

By comparing Examples 7 and 8, it can be understood that by using a reflector, the drying time was reduced from 150 seconds to 120 seconds. As a result, it can be understood that by using a reflector, the coating solution can be efficiently dried.

REFERENCE SIGNS LIST

1 preform
5 preform coating device
6 dispenser
7 dryer
8 conveyance part
31 first blower mechanism
31*b* flow rate adjustment mechanism
32 second blower mechanism
32*b* flow rate adjustment mechanism
33 third blower mechanism
33*b* flow rate adjustment mechanism
72 reflector

The invention claimed is:

1. A preform coating device, comprising:
a conveyance part for conveying a preform,
a dispenser for discharging a coating solution toward the preform,
a dryer that is arranged spaced apart from the dispenser along a conveyance path of the conveyance part and that dries the coating solution applied to the preform by irradiating the coating solution applied to the preform with infrared light, and
a first blower mechanism that blows gas on the preform for reducing a temperature of the preform, at a position in which the preform is irradiated with the infrared light by the dryer,
a second blower mechanism that blows gas on a surface of the dryer for reducing a temperature of the surface of the dryer, and
a third blower mechanism that is arranged on a downstream side of the dryer and that blows gas toward the preform.

2. The preform coating device according to claim 1, further comprising a flow rate adjustment mechanism for adjusting a flow rate of the first blower mechanism.

3. The preform coating device according to claim 1, further comprising a reflector arranged at a position facing the dryer across the preform.

4. The preform coating device according to claim 1, wherein the first blower mechanism blows room temperature gas.

5. The preform coating device according to claim 1, further comprising a flow rate adjustment mechanism for adjusting a flow rate of the second blower mechanism.

6. The preform coating device according to claim 1, wherein the second blower mechanism blows room temperature gas.

* * * * *